April 28, 1936.  H. LINDNER  2,039,231
DEVICE FOR MEASURING THE ADJUSTMENT OF MACHINE TOOL CARRIAGES
Filed Feb. 8, 1935
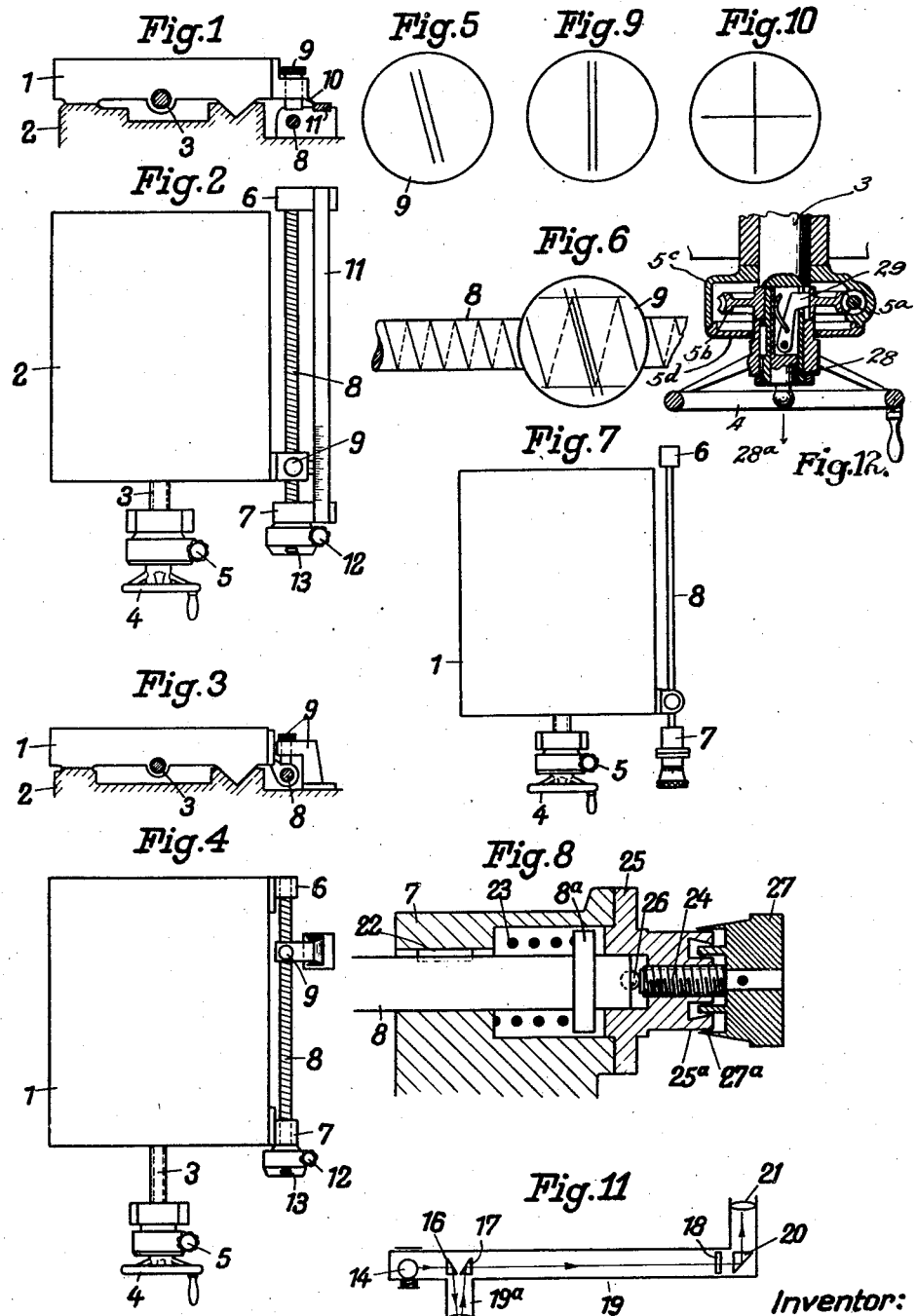
Inventor:
Herbert Lindner
By Franks Appleman
Attorney Patented Apr. 28, 1936

2,039,231

UNITED STATES PATENT OFFICE 2,039,231

DEVICE FOR MEASURING THE ADJUSTMENT OF MACHINE TOOL CARRIAGES

Herbert Lindner, Berlin, Germany

Application February 8, 1935, Serial No. 5,681
In Germany May 14, 1934

8 Claims. (Cl. 33—181)

This invention relates to the adjustment of the rectilinear movement of an element and more particularly the work carriage of a machine tool such as a jig boring machine and the like.

It is usual to determine the adjustment of the work carriage of a machine tool by means of end gauges which are inserted between a gauge surface on the carriage and a corresponding gauge surface on the stationary bed of the machine tool. This method of adjustment is however very rough and for the longer distances of adjustment the errors of each separate measuring operation are cumulative. It is also usual to determine the extent of the adjustment by means of a screw-threaded spindle by which the carriage is displaced, the coarse adjustment being read on a longitudinal scale and the fine adjustment on a graduated cylindrical scale mounted on the screw-threaded spindle. In many cases correcting devices are provided in order to overcome the cumulative inaccuracies of the spindle. After long use, however, with varying loads inaccuracies of the screw-thread of the spindle are developed which reduce the accuracy of the adjustment. Even with a perfect screw-threaded spindle the adjustment of the carriage cannot be effected with the accuracy of a few thousandths of a millimetre as is required at the present time. The spindle is subjected to torsional stresses and strains due to the weight of the carriage to be displaced which also make a difference of thousandths of a millimetre and prevent the attainment of the great accuracy required.

The invention provides a new way of attaining the perfect adjustment result. By utilizing an optical device which is in itself known, for determining the longitudinal extent of the distance to be measured a fine adjustment of the scale for the smallest subdivision of this distance can be effected and the part to be adjusted (for example the carriage) is then moved to such an extent that an indication mark in the optical device again coincides with the division line on the scale.

The mechanism for practicing this method may comprise for example a cylindrical longitudinal scale of which the cylindrical surface is provided with a fine helical line the scale being rotatably mounted and cooperating with the optical device. The fine adjustment of the scale is effected by rotation and measurement subdivisions are read on a ring scale and vernier.

In another embodiment of the invention the longitudinal scale cooperating with the optical device is provided with the ordinary division lines or a helical division line as in the construction above described but the scale is arranged to be axially displaceable and for the fine adjustment is provided with a micrometer device.

The invention completely eliminates the carriage spindle as the device determining the accuracy of the measurement, its place for this purpose being taken by the scale which is relieved of mechanical stress and in cooperation with the optical device renders the determination of the carriage displacement to be effected within very precise limits in a simple manner.

The invention is illustrated by way of example in the accompanying drawing of which Figure 1 is a diagrammatic cross-sectional view of the work carriage of a machine tool provided with adjusting mechanism embodying one form of the invention, Figure 2 being a plan view of Figure 1, Figure 3 is a view similar to Figure 1 and illustrating a modified form of mechanism, Figure 4 being a plan view of Figure 3, Figure 5 is a diagrammatic view of the optical device, Figure 6 showing the optical device and a portion of the longitudinal scale, Figure 7 is a plan view similar to Figures 2 and 4 and illustrating a further modification.

Figure 8 is an enlarged sectional view of the micrometer device shown in Figure 7, Figures 9 and 10 being diagrammatic plan views of the optical device employed in the construction of Figure 7, Figure 11 is a diagrammatic view of a form of optical device which enables the scale reading to be effected at the operator's position at the machine.

Referring now to the drawing it will be seen that the movable member to be adjusted through a certain displacement is represented as the carriage 1 of a machine tool which is adapted to slide in a groove in the bed 2 of the machine, this displacement of the carriage 1 being effected by a screw-threaded spindle 3 operated by a hand wheel 4. For the fine adjustment of the carriage 1 a hand wheel 5 is provided which cooperates with a worm gear. In the construction of Figure 1 a cylindrical longitudinal scale 8 is rotatably mounted in bearings 6, 7 on the bed 2 of the machine, the scale 8 being parallel to the direction of movement of the carriage and being capable of rotation without axial displacement. The cylindrical surface of the scale 8 is provided with a fine helical line produced by engraving by means of a diamond or in any similar suitable manner. An optical device 9 is mounted on the carriage 1 and is arranged to cooperate with the scale 8, the device 9 having a reading mark which may consist for example of two parallel lines arranged in the direction of the pitch of the helical division lines on the scale 8 (see Figure 5). A second longitudinal scale 11 having the usual scale divisions is arranged alongside the scale 8 and the optical device 9 is provided with an indication pointer 10 for the scale 11. The pointer 10 can of course, if desired, be directly mounted on the carriage 1 with a suitable somewhat different arrangement of the scale 11. The provision of the scale 11 is not absolutely necessary but is advisable in cases in which the pitch of the helical line on the cylindrical scale 8 is very small so that division numerals are very difficult to insert.

The scale 8 is arranged to be rotated by a worm mechanism operated by the hand wheel 12 and the extent of its rotation is read on a circular scale 13 provided with a vernier. In the construction shown in Figures 3 and 4 the cylindrical scale 8 is mounted on the carriage, the optical device 9 being mounted on the stationary bed 2 of the machine. The adjustment of the carriage 1 through the required displacement distance is effected in the following manner.

The carriage 1 is first set to its initial position the cylindrical scale 8 being then rotated so as to bring its helical division line between the parallel lines on the optical device 9 (see Figure 6). The carriage 1 is now adjusted by means of the spindle 3 to approximately the required distance, preferably to an exact number of length units. The scale 8 is then rotated to take account of the remaining fractional distance and the carriage 1 is moved further forward by the hand wheel 5 until reading lines on the optical device 9 again coincide with the helical division line on the scale 8. Assume for example that the carriage 1 is to be adjusted to a displacement distance of 455.325 mm. After the carriage has been brought to its initial position in the manner above described, the carriage is moved through the distance 455 mm. by means of the spindle 3. The scale 8 is then rotated to an extent corresponding to 0.325 mm. as read on the circular scale 13 and its vernier. The carriage is now moved further by means of the fine adjustment 5 until the lines on the optical device 9 again coincide with the helical division line on the scale 8. The adjustment to the measured distance can of course be effected in the converse manner by first setting the fractional part of the required distance. In the present case 0.325 mm., by means of the scale 8, and then moving the carriage 1 in the manner described to the further distance of 455 mm. As a further manner of adjustment the carriage may be first set to a whole number of length units greater than the required distance and the setting then reduced to that required by a corresponding backward displacement of the carriage 1.

In the constructional form shown in Figure 7, a cylindrical scale is provided having a helical division line or the usual straight graduations the adjustment of this scale to take account of the fractional part of the required distance being effected in this case by the axial displacement of the scale by means of a micrometer device constructed for example as shown in Figure 8. The longitudinal scale 8 is so mounted in its bearing 7 as to be capable of axial displacement without rotation, its rotation being prevented, for instance, by means of a feather 22, which slides in a corresponding lateral groove. The scale 8 is provided with a collar 8a and is resiliently held against a micrometer screw-threaded spindle 24 by means of a spring 23 which at one end abuts against the bearing 7 and at the other end against the collar 8a. The internal screw-thread with which the micrometer spindle 24 engages, is formed in a cap member 25 which closes the bearing 7 at one end thereof. Contact between the scale 8 and the micrometer spindle 24 is effected by a ball 26, so that only single point engagement occurs. A knob 27 is secured to the micrometer spindle 24, the conical surface 27a of this knob being provided with fine graduations which cooperate with corresponding graduations on the cylindrical portion 25a of the cap member 25.

In order to protect the micrometer spindle 24 against dirt, the knob 27 and the cap member 25 are arranged to fit into each other in the manner of a labyrinth-seal as shown. In Figure 7 the optical device is shown as mounted on the carriage while the scale is mounted on the bed of the machine, but it will be evident that the scale and its micrometer device may if desired be mounted on the carriage as in the construction of Figures 3 and 4 in which case the optical device will be mounted on the stationary bed of the machine.

The field of the optical device may comprise parallel reading lines (Figure 9) or a cross mark (Figure 10). If, for instance, a displacement distance of 622,525 mm. is to be set the reading lines or mark in the field of the optical device is first caused to coincide with the corresponding division line on the scale for the initial setting of the carriage to a certain scale division. The carriage 1 is then adjusted by means of the spindle 3 through a distance of 622 mm., after which the scale 8 is axially displaced to the remaining extent of 0.525 mm. by means of the micrometer device and the carriage 1 is moved through a further distance by fine adjustment by the hand wheel 5 until the reading lines or mark on the optical device again coincide with the division line on the scale 8.

It will be evident that the accuracy of the screw-threaded spindle 3 is quite immaterial since this spindle is not utilized for the measurement of the displacement of the carriage 1.

In cases in which the carriage 1 has to be displaced through a very considerable distance, difficulty is encountered in simultaneously operating the displacement devices 4, 5 and observing the measured distance by means of the optical device 9 and the latter is accordingly so constructed that the displacement can be observed by the operator without leaving his usual control position at the machine. One construction of optical device for this purpose is illustrated diagrammatically in Figure 7 in which a beam of light from a suitable source 14 is directed through a prism 16 and a lens 15 on to the scale 8 an image of a portion of the scale being formed on a glass plate 18 by the lens 15 and a prism 17. The plate 18 is provided with a line mark as shown, for instance, in Figure 5. The operator at the control position is thus provided with a superposed view of the graduations of the scale 8 and the line mark on the plate 18 through the optical system 20, 21. The whole of the optical arrangements are mounted in a tube 19 which may be arranged to be rotatable about the axis of the portion 19a of the tube, so that the field of vision of the device can be readily adjusted to the control position of the operator.

It will be understood that, conversely, the invention may be utilized for the checking or control of measured distances.

It is to be understood that while in the particular embodiment of the invention here shown and described, the device is attached to the bed and carriage of a machine tool, the measuring elements may be attached to any two machine tool elements one of which moves longitudinally of the other. For instance, the measuring device may have its parts attached to the cross-rail and vertical frame of a vertical boring mill to measure the movement of the cross-rail. Again, the parts may be attached to the cross-rail and tool head of such a machine. Many other arrangements and uses of the measuring device will suggest themselves to those skilled in the art.

I claim:—

1. The combination with a machine tool bed and a carriage slidable on said bed; of a scale adjustably supported on said bed, means carried by the bed and associated with the scale for moving the scale to effect fine adjustment thereof, an index supported by the carriage for traversing said scale, and an optical system supported from the carriage and having the index in its optical field for observing the scale and index.

2. The combination with a machine tool bed and a carriage movable thereon; of a scale rotatably supported from the carriage and having a spiral scale line extending therearound, means supported from the carriage and operatively connected with the scale for measuring fractional parts of a complete rotation of the scale, an index supported by the bed and beneath which the scale moves upon movement of the carriage and an optical system supported from the carriage and having the index in its optical field for observing said scale and index.

3. The combination with a pair of machine tool elements one of which is slidable along the other, of means for measuring the displacement of one of said machine tool elements longitudinally of the other and including a scale adjustably supported on one of said elements, means carried by the scale supporting element and associated with the scale for moving the same to effect fine adjustment thereof, and microscopic means carried by the other element in position to observe said scale.

4. The combination with a pair of machine tool elements one of which is slidable along the other, of means for measuring the displacement of one of said machine tool elements longitudinally of the other and including a cylindrical scale supported for rotation by one of said elements and having a spiral scale line extending therearound, means associated with said scale for indicating fractional rotative movements of the scale, and index means for said scale carried by the remaining machine tool element.

5. The combination with a pair of machine tool elements one of which is slidable along the other, of means for measuring the displacement of one of said machine tool elements longitudinally of the other and including a cylindrical scale having a spiral scale line extending therearound, means carried by one of said elements and rotatably supporting the scale, a head fixed on said scale and having circumferential graduations, said means having an index cooperating with said head, and index means for said scale carried by the remaining machine tool element.

6. The combination with a pair of machine tool elements one of which is slidable along the other, of means for measuring the displacement of one of said machine tool elements longitudinally of the other and including a cylindrical scale having a spiral scale line extending therearound, means carried by one of said elements and rotatably supporting the scale, a head fixed on said scale and having circumferential graduations, said means having an index cooperating with said head, a fixed scale carried by said machine tool element parallel to the first scale, and index means for said scales carried by the remaining machine tool element.

7. The combination with a pair of machine tool elements one of which is slidable along the other, of means for measuring the displacement of one of said machine tool elements longitudinally of the other and including a scale guide, means on one of the elements supporting said scale for longitudinal movement relative to said element, index means for said scale carried by the remaining machine tool element, and micrometric means carried by the guide means for effecting minutely measurable movement of the scale.

8. The combination with a pair of machine tool elements one of which is slidable along the other, of means for measuring the displacement of one of said machine tool elements longitudinally of the other and including a scale guide, means on one of the elements supporting said scale for longitudinal movement relative to said element, index means for said scale carried by the remaining machine tool element, a micrometer fixed to the guide means and having a screw alined with said scale and bearings on an end thereof, and a spring engaging the scale and holding it against the screw.

HERBERT LINDNER.